# (12) United States Patent
Bastug et al.

(10) Patent No.: US 8,208,457 B2
(45) Date of Patent: Jun. 26, 2012

(54) SYMBOL-LEVEL ADAPTATION METHOD, MEMORY, EQUALIZER AND RECEIVER FOR IMPLEMENTING THIS METHOD

(75) Inventors: Ahmet Bastug, Istanbul (TR); Pierre Demaj, Nice (FR)

(73) Assignee: ST-Ericsson SA, Geneva (CH)

( * ) Notice: Subject to any disclaimer, the term of this patent is extended or adjusted under 35 U.S.C. 154(b) by 659 days.

(21) Appl. No.: 12/299,301

(22) PCT Filed: Feb. 8, 2007

(86) PCT No.: PCT/IB2007/050411
§ 371 (c)(1),
(2), (4) Date: Jul. 6, 2009

(87) PCT Pub. No.: WO2007/096799
PCT Pub. Date: Aug. 30, 2007

(65) Prior Publication Data
US 2009/0296679 A1 Dec. 3, 2009

(30) Foreign Application Priority Data
Feb. 22, 2006 (EP) ................................. 06300156

(51) Int. Cl.
*H04B 7/216* (2006.01)
*H04W 4/00* (2009.01)

(52) U.S. Cl. .................. 370/342; 370/341; 370/340
(58) Field of Classification Search ............. 370/342
See application file for complete search history.

(56) References Cited

U.S. PATENT DOCUMENTS

| 6,175,588 B1 | 1/2001 | Visotsky et al. |
| 6,680,902 B1 | 1/2004 | Hudson |
| 2005/0141598 A1 | 6/2005 | Akita |
| 2006/0154633 A1 | 7/2006 | Wang |

FOREIGN PATENT DOCUMENTS

| JP | 11266232 A | 9/1999 |
| JP | 2005260433 A | 9/2005 |
| WO | 01/58038 A1 | 8/2001 |
| WO | 2004/068779 A1 | 8/2004 |

OTHER PUBLICATIONS

International Search Report; PCT/IB2007/051068; Sep. 9, 2007.
Petre, Frederik, et al., "Pilot-aided Adaptive Chip Equalizer Receiver for Interference Supression in DS-CDMA Forward Link", Interuniversity Micro Electronics Center (IMEC). Kapeldreef 75, B-3001 Leuven—Belgium, IEEE, VTC 2000, pp. 303-308.

(Continued)

*Primary Examiner* — Jeffrey Pwu
*Assistant Examiner* — Shripal Khajuria
(74) *Attorney, Agent, or Firm* — Hogan Lovells US LLP

(57) ABSTRACT

A symbol-level adaptation method to adapt at least one coefficient of an equalizer, wherein the method comprises the steps of: a) determining (144) if there exists a shortened pilot channelization code which has a spreading factor shorter than the spreading factor of a full pilot channelization code and which is, at the same time, still orthogonal to any other simultaneously active channelization codes, and, b) if there exists a shortened pilot channelization code, despreading (162) the pilot channel using the shortened pilot channelization code to obtain a pilot symbol estimation, and c) adapting (168) the value of the equalizer coefficient according to the error between the pilot symbol estimation obtained from step b) and a corresponding expected pilot symbol.

9 Claims, 4 Drawing Sheets

OTHER PUBLICATIONS

Widrow, Bernard, et al., "On the Statistical Efficiency of the LMS Family of Adaptive Algorithms", ISL, Department of Electrical Engineering, Stanford University, Stanford, CA, IEEE, pp. 2872-2880.

Frank, Colin D. et al., "Adaptive Interference Suppression for the Downlink of a Direct Sequence CDMA System with Long Spreading Sequences", Journal of VLSI Signal Processing 30, pp. 273-291, 2002, Kluwer Academic Publishers.

SYMBOL-LEVEL ADAPTATION METHOD, MEMORY, EQUALIZER AND RECEIVER FOR IMPLEMENTING THIS METHOD

FIELD OF THE INVENTION

The present invention relates to a symbol-level adaptation method for equalizer coefficients, a memory, an equalizer and a receiver for implementing the method.

BACKGROUND OF THE INVENTION

The terminology used throughout this specification corresponds to that defined in 3GPP (Third Generation Partnership Project) standards concerning CDMA (Code Division Multiple Access) communication systems like UMTS (Universal Mobile Telecommunication System).

It is noted that in CDMA communication systems, spreading is applied to the physical channels used to transmit data symbols from an emitter to a receiver. Spreading comprises at least a channelization operation which transforms every data symbol into a chip sequence made up of a plurality of chips, thus increasing the bandwidth of the transmitted signal. A chip is the minimal duration keying element. The number of chips per data symbol is called the spreading factor.

During the channelization operation, each data symbol from one channel is multiplied by a channelization code. Generally, a plurality of channels are simultaneously transmitted from the emitter to the receiver. Each channel is associated with its own channelization code. In orthogonal CDMA systems, the channelization codes are orthogonal. For example, OVSF (Orthogonal Variable Spreading Factor) codes are used.

In CDMA communication systems, transmission from the emitter to the receiver includes at least one pilot channel and a plurality of traffic channels. The pilot channel is used to transmit predetermined data symbols known by each receiver. These predetermined data symbols are called pilot symbols. The pilot channel can be despread by all receivers.

Each traffic channel is intended to be despread by a single receiver. Therefore, each traffic channel is spread using a channelization code known only by both the emitter and this receiver. The pilot channel, on the contrary, is spread using a channelization code known by the emitter and all receivers.

Equalizers are used in orthogonal CDMA receivers to equalize the channels received at the receiver, thus approximately restoring the orthogonality amongst the received chip sequences and reducing the interchip interferences (ICI). In other words, the equalizer corrects channel distortions at chip level.

Channel distortions vary in time. Thus, it is necessary to adapt the equalizer coefficients to track the channel changes. To this end, there are methods to adapt the equalizer coefficients according to channel distortions. The existing methods include the step of:

adapting the value of the equalizer coefficients according to an error between a pilot symbol estimation outputted by a despreader and the corresponding expected pilot symbol.

These existing methods are known as "symbol-level adaptation", because the error to be minimized is the error between a despread pilot symbol and the corresponding expected pilot symbol. If, on the contrary, the error to be minimized is the error between a chip of the pilot symbol and the corresponding chip of the expected pilot symbol, the adaptation method is known as "chip-level adaptation". The difference between symbol-level adaptation and chip-level adaptation is described in further detail in article D1:

Colin D. Frank, Eugene Visotsky and Upamanyu Madhow "Adaptive interference suppression for the downlink of a direct sequence CDMA system with long spreading sequence"; Journal of VLSI Signal Processing, vol. 30, no. 1, pp 273-291, March 2002.

Symbol-level adaptation methods have proven to be efficient. However, symbol-level adaptations can only be done at pilot symbol rate. In fact, it is necessary to wait for the reception of every chip of a pilot symbol before starting despreading this pilot chip sequence to obtain a reliable estimation of the pilot symbol from which the error can be calculated. For example, if the pilot channelization code has a spreading factor of 256, symbol adaptation can be carried out only every 256 chip intervals. Consequently, the symbol-level adaptation methods are slow in tracking fast-changing channels.

A solution to this problem has already been proposed in U.S. Pat. No. 6,175,588 in the name of Visotsky et al. More precisely, U.S. Pat. No. 6,175,588 discloses how to despread pilot symbols using a channelization code shorter than the full pilot channelization code so as to generate a pilot symbol estimation at a higher rate than the pilot symbol rate. However, the shorter pilot channelization code is not orthogonal to other simultaneously used channelization codes. As a result, the obtained pilot symbol estimation is strongly disturbed by other symbols that are simultaneously received over other channels. The reliability of this method is poor.

SUMMARY OF THE INVENTION

Accordingly, it is an object of the invention to provide a symbol-level adaptation method that can better track fast-changing channels.

The invention provides a symbol-level adaptation method that includes the steps of:

a) determining if there exists a shortened pilot channelization code which has a spreading factor shorter than the spreading factor of the full pilot channelization code and which is, at the same time, still orthogonal to any other simultaneously active channelization codes, a channelization code being "active" if the power of the signal despread with this channelization code is higher than a predetermined threshold, and, b) if there exists a shortened pilot channelization code, despreading the pilot channel using the shortened pilot channelization code to obtain a pilot symbol estimation, or in the absence of such a code, despreading the pilot channel using the full pilot channelization code to obtain the pilot symbol estimation, and c) adapting the value of the equalizer coefficient according to the error between the pilot symbol estimation obtained from step b) and a corresponding expected pilot symbol.

The above symbol-level adaptation method can be carried out at a higher rate than the pilot symbol rate, because pilot channel despreading can be carried out more than once per pilot symbol period if there exists a shortened pilot channelization code. Furthermore, when pilot symbol despreading is done at a rate higher than the pilot symbol rate, the reliability of the pilot symbol estimation remains unaltered, because the shortened pilot channelization code used for this purpose is still orthogonal to any other currently used channelization codes. As a result, it is possible to adapt the equalizer coefficients faster than with known methods using only the full pilot channelization code, while said equalizer coefficients remain as reliable as with these known methods.

The above symbol-level adaptation method also makes despreading of a pilot symbol faster, since a shortened pilot channelization code is used at least from time to time.

The embodiments of the above method may comprise one or several of the following features:

step a) comprises the operations of estimating the power of a signal despread with one of the currently used channelization codes and of comparing the estimated power to the predetermined threshold to establish if the channelization code is an active channelization code or not, the predetermined threshold is chosen high enough, so that a channelization code simultaneously used to transmit a low power signal that cannot disrupt the despreading of the pilot channel is considered for step a) as a non-active channelization code, step a) comprises an operation of establishing that a channelization code is a non-active channelization code according to instructions received through one of the channels, step a) comprises the operation of selecting the channelization code associated with a parent node of a node associated with the full pilot channelization code in an OVSF (Orthogonal Variable Spreading Factor) code tree, this parent node:
  having no other child node associated with a simultaneously active channelization code, and
  being as close as possible to a root node of the OVSF code tree.

if there exists a shortened pilot channelization code having a spreading factor x times smaller than the spreading factor of the full pilot channelization code, at least steps b) and c) are executed at the end of each shortened pilot symbol period $T_{SS}$, period $T_{SS}$ being defined as follows:

$T_{SS} = T_{fs}/x$, where $T_{fs}$ is the full pilot symbol period.

The above embodiments of the method present the following advantages:

estimating the power of the despread signal to discriminate active from non-active codes results in the fact that non-active channelization codes are encountered more often than if only non-currently used channelization codes are considered as non-active channelization codes and thus the adaptation of equalizer coefficients occurs more often, using instructions received from an emitter to determine which channelization code is currently used, makes it possible to avoid estimating the power of the signal despread with this channelization code, and using the OVSF code tree allows to simply determine the shortest possible pilot channelization code which is still orthogonal to any other active channelization codes and, finally, results in a fast equalizer coefficient adaptation.

The invention also relates to a memory comprising instructions for executing the above symbol-level adaptation method when the instructions are executed by an electronic calculator.

The invention also relates to an equalizer suitable to execute the above symbol-level adaptation method as well as to an orthogonal CDMA receiver equipped with such an equalizer.

These and other aspects of the invention will be apparent from the following description, drawings and claims.

DETAILED DESCRIPTION

Figure 1:
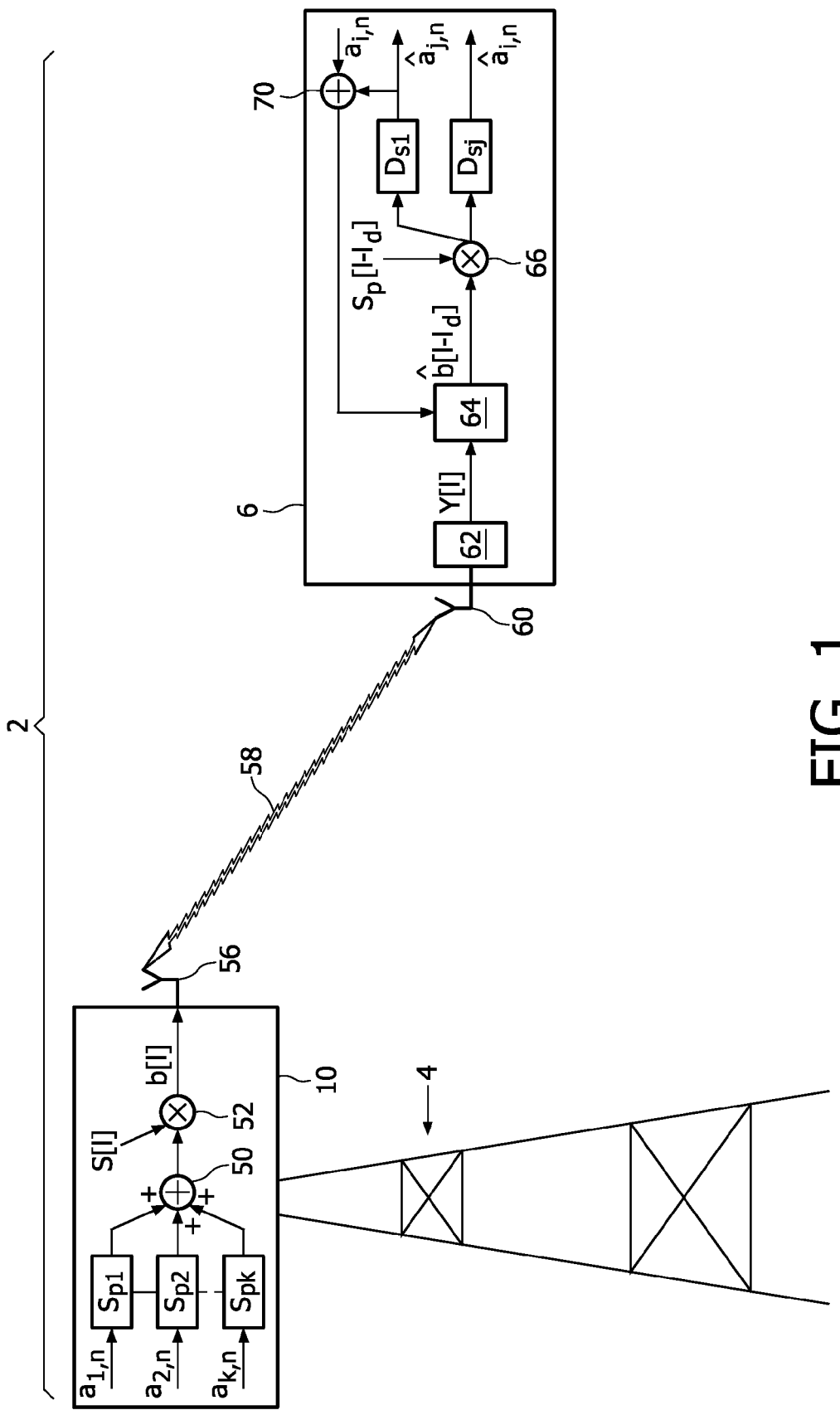
FIG. 1 is a schematic diagram of the architecture of an orthogonal CDMA communication system.

FIG. 1 shows an orthogonal CDMA communication system 2. In the following description, functions or constructions well known to a person of ordinary skill in the art are not described in details.

For example, system 2 is a wireless telecommunication network like a UMTS system.

For simplicity, only one base station 4 and only one user equipment are shown. For example, the user equipment is a radio receiver 6 like a mobile phone.

Base station 4 has a radio orthogonal CDMA emitter 10 to transmit data symbols to many user equipments within a cell.

For example, emitter 10 conforms to the specification of 3GPP TS 25.213 standards concerning spreading and modulation. Therefore, only the details of emitter 10 necessary to understand the invention are described here.

Emitter 10 is designed to transmit simultaneously K data symbols $a_{1,n}, a_{2,n}, \ldots, a_{i,n}, \ldots a_{K,n}$, where index i identifies a channel and index n identifies the order number of the symbol transmitted through channel i. For illustration purposes only, we assume here that symbol $a_{1,n}$ is a pilot symbol to be transmitted in the channel known as PCPICH (Primary Common Pilot Channel). We also assume that symbol $a_{2,n}$ is the symbol to be transmitted through a PCCPCH (Primary Common Control Physical Channel). The other symbols, $a_{3,n}$ to $a_{K,n}$, are to be transmitted in other channels defined in the UMTS standards, such as traffic channels, for example.

Each symbol $a_{i,n}$ is transmitted to a respective module $S_{pi}$ that performs a channelization operation. More precisely, each module $S_{pi}$ multiplies the received symbol $a_{i,n}$ by a channelization code $C_i$ which is orthogonal to any other channelization codes simultaneously used for other channels.

Figure 2:
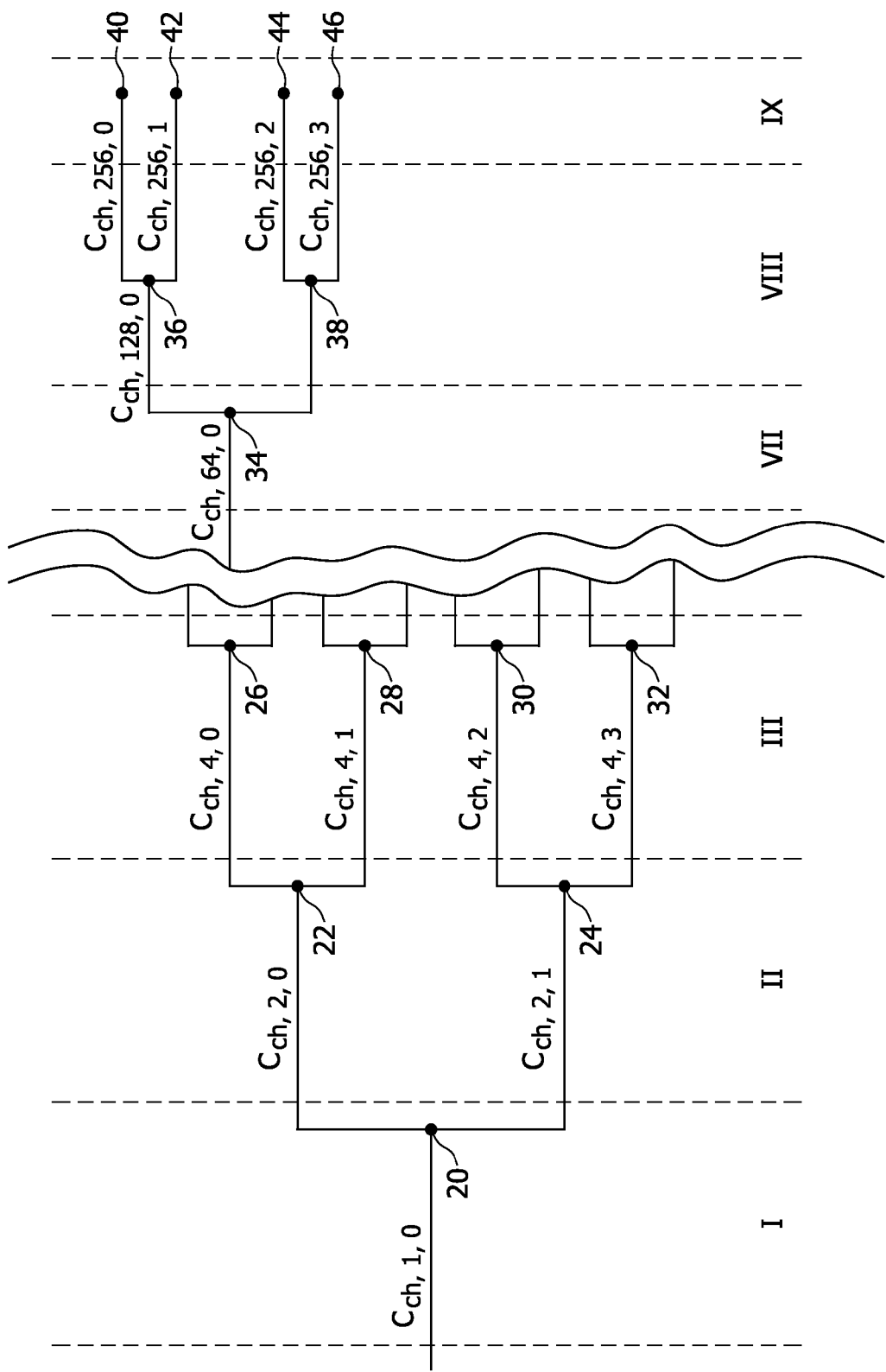
FIG. 2 is an illustration of an OVSF code tree used in the system of FIG. 1.

Channelization code $C_i$ is chosen in the OVSF code tree of FIG. 2, for example. In FIG. 2, the notation $C_{ch, SF,n}$ denotes the $n^{th}$ channelization code with spreading factor SF.

The code tree of FIG. 2 and the allocation of each code to respective channels is described in the 3GPP TS 25.213 standard.

In FIG. 2, only code tree levels I, II and III have been fully represented and code tree levels VII, VIII and IX have only been partially shown. Code tree levels IV to VI are not shown in FIG. 2.

Level I includes only a root node 20 corresponding to channelization code $C_{ch,1,0}$.

Level II includes two child nodes 22 and 24 of root node 20. Nodes 22 and 24 correspond respectively to channelization codes $C_{ch,2,0}$ and $C_{ch,2,1}$. These two channelization codes are orthogonal. In level II, each channelization code has a spreading factor equal to two.

Nodes 22 and 24 are also parent nodes for child nodes 26, 28 and 30, 32, respectively. Nodes 26, 28, 30 and 32 correspond to channelization code $C_{ch,4,0}$, $C_{ch,4,1}$, $C_{ch,4,2}$ and $C_{ch,4,3}$. The channelization codes of level III have a spreading factor equal to four and are orthogonal to each other.

Each node of level III is a parent node for two child nodes in level IV and so on.

FIG. 2 only shows:
- a node 34 corresponding to channelization code $C_{ch,64,0}$ in level VII,
- two child nodes 36 and 38 corresponding to channelization codes $C_{ch,128,0}$ and $C_{ch,128,1}$ in level VIII, respectively, and
- four nodes 40, 42, 44 and 46 corresponding to channelization codes $C_{ch,256,0}$, $C_{ch,256,1}$, $C_{ch,256,2}$ and $C_{ch,256,3}$, in level IX, respectively.

It should be noted that a channelization code corresponding to one node of the OVSF code tree in FIG. 2 is orthogonal to any channelization code associated with a node in the same level. This channelization code is also orthogonal to any channelization codes associated with a child node of one of the other nodes in the same level. For example, channelization code $C_{ch,2,1}$ is orthogonal to channelization code $C_{ch,2,0}$ as well as to any channelization code associated with child nodes of node 22. As a result, channelization code $C_{ch,2,1}$ is orthogonal to channelization code $C_{ch,256,0}$ or $C_{ch,256,1}$.

Contrary to the above, the channelization code associated with a parent node is not orthogonal to the channelization code associated with its child nodes. For example, channelization code $C_{ch,128,0}$ is not orthogonal to channelization code $C_{ch,256,0}$ or $C_{ch,256,1}$ but is orthogonal to channelization code $C_{ch,256,2}$.

For illustration purposes we assume that channelization codes $C_1$ and $C_2$, defined hereabove, are equal to channelization codes $C_{ch,256,0}$ and $C_{ch,256,1}$, respectively.

The output of each module $S_{pi}$ is connected to an adder 50. Adder 50 adds the chip sequences corresponding to each spread symbol $a_{i,n}$.

Adder 50 outputs the resulting global chip sequence to a scrambler 52. Scrambler 52 scrambles the global chip sequence. More precisely, scrambler 52 multiplies the global chip sequence by a scrambling code S[I] to obtain a scrambled global chip sequence b[1]. Sequence b[1] is transmitted through different modules (not shown) before being radiated in the air by an antenna 56 as a radio signal 58. Radio signal 58 is known as a "downlink signal" in CDMA communication systems.

Receiver 6 has an antenna 60 to receive radio signal 58 and a radio frequency receiver 62 to convert the received radio signal into a baseband scrambled global chip sequence y[1].

Sequence y[1] can be estimated according to the following relation:

$$y[1]=b[1]*h[1]+v[1] \quad (1)$$

where:
- b[1] is the scrambled global chip sequence,
- h[1] is a time-varying chip-rate discrete-time system,
- v[1] is a perturbation term which models the average gaussian noise and the interference coming from other base stations, and
- symbol "*" is the convolution operation.

Sequence y[1] enters an adaptive equalizer 64 that outputs an estimated scrambled global chip sequence $\hat{b}[1-1_d]$. The equalization of sequence y[1] introduces a delay equal to $1_d$.

The estimated global chip sequence $\hat{b}[1-1_d]$ is received by a descrambler 66 that descrambles the estimated chip sequence. In fact, descrambler 66 multiplies sequence $\hat{b}[1-1_d]$ by a complex conjugate $S^*[1-1_d]$ of the scrambling code $S[1-1_d]$ used in emitter 10 at instant $1-1_d$.

The descrambled global chip sequence is then transmitted to despreader $D_{s1}$ and other despreader $D_{sj}$.

Despreader $D_{s1}$ despreads the descrambled global chip sequence to obtain a pilot symbol estimation $\hat{a}_{1,n}$. To do so, despreader $D_{s1}$ multiplies the descrambled global chip sequence by the channelization code $C_1$.

Pilot symbol estimation $\hat{a}_{1,n}$ is transmitted to a subtracter 70 that subtracts from pilot symbol estimation $\hat{a}_{1,n}$ the corresponding expected pilot symbol $a_{1,n}$ to obtain an error e. It is noted that pilot symbols are predetermined pilots that are known before reception by receiver 6. Subtracter 70 transmits error e to equalizer 64 so that equalizer 64 can adapt its own coefficients to minimize this error e. A specific embodiment of equalizer 64 will be described in more detail with reference to FIG. 3.

Despreader $D_{sj}$ despreads the descrambled global chip sequence using a conjugate of another channelization code to obtain a symbol estimation $\hat{a}_{j,n}$ of a symbol transmitted through channel j.

Figure 3:
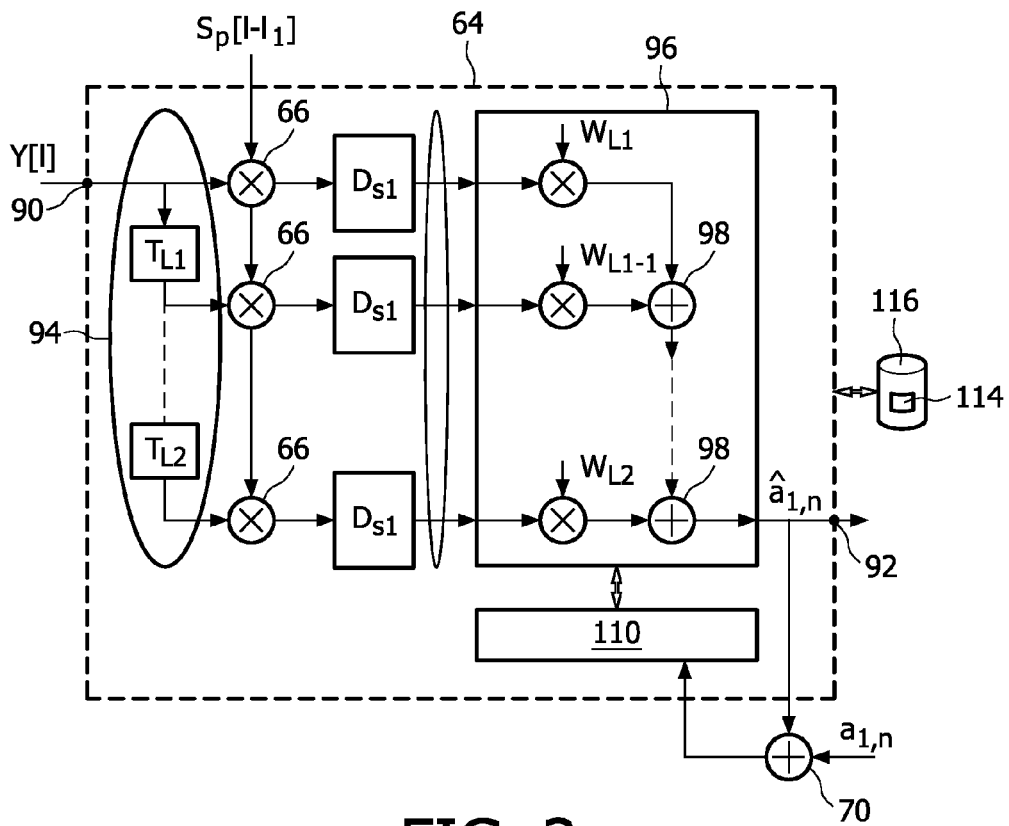
FIG. 3 is a schematic diagram of a specific embodiment of an adaptive equalizer that can be used in the system of FIG. 1.

FIG. 1 shows an embodiment of receiver 6 in which equalization takes place before descrambling and despreading. However, in FIG. 3, equalizer 64 is described in more detail in the case where descrambling and despreading take place before equalization. The general features of the equalizer 64 of FIG. 3 are described in article D1 mentioned hereinabove.

Equalizer 64 has an input 90 to receive sequence y[1] and an output 92 to output pilot symbol estimation $\hat{a}_{1,n}$.

Equalizer 64 includes an adaptive filter 96 defined by the equation $$C(z) = \sum_{m=L1}^{L2} W_m Z^{-m} \quad (2)$$

where:
- $W_m$ with $L_1 \leq m \leq L_2$ are the $L_2-L_1+1$ coefficients of filter 96, and
- $Z^{-m}$ represents a delay of m chip intervals.

Filter 96 may take the form of a finite transversal filter or any other suitable structure. Equalizer 64 adapts the coefficients of filter 96 to minimize the mean-square error due to noise, interferences and interchip interferences. The adaptation of the adaptive equalizer 64 is driven by error e, which indicates to the equalizer the direction into which the coefficients should be moved in order to more accurately represent the data.

Accordingly, equalizer 64 has a tap delay-line 94 connected to input 90 and including $L_1+L_2$ delay block $T_{L1}$ to $T_{L2}$. Each delay block delays sequence y[1] by a chip interval.

Filter 96 has $L_2-L_1+1$ parallel branches. One extremity of each branch is connected to a corresponding input of filter 96, whereas the other extremity is connected to an adder 98 that adds the results outputted by each of the parallel branches. Each parallel branch includes a multiplier that multiplies the signal inputted at one extremity of this branch by a respective coefficient $W_m$. In FIG. 3, the parallel branches are arranged according to the order of the coefficients, so that the uppermost branch multiplies the input signal by $W_{L1}$, whereas the lowest parallel branch multiplies the input signal by coefficient $W_{L2}$.

The input of the uppermost parallel branch is connected to input 90 through despreader $D_{s1}$ and descrambler 66. The other parallel branches are connected to respective outputs of delay block $T_{Li}$ through despreader $D_{s1}$ and descrambler 66. As explained in article D1, the above structure first performs descrambling and despreading before equalization.

Equalizer 64 also comprises a calculator 110 that is able to modify the value of each coefficient $W_m$ of filter 96 so as to adapt equalizer 64 according to channel changes. More precisely, calculator 110 is able to execute an adaptive algorithm that calculates the value of coefficients $W_m$ that minimize error e. To this end, the algorithm executed by calculator 110 is a MMSE (Minimising Mean Square Error) algorithm. Preferably, among the different MMSE algorithms, the adaptive algorithm used in this embodiment is an LMS (Least Mean Square) algorithm or an NLMS (Normalized Least Mean Square) algorithm. LMS and NLMS algorithms are described in further detail in the following document:

"*On the statistical efficiency of the LMS family of adaptive algorithms*" (Bernard Widrow and Max Kamenetsky, ISL-Department of Electrical Engineering, Stanford University, Stanford Calif.).

Figure 4:
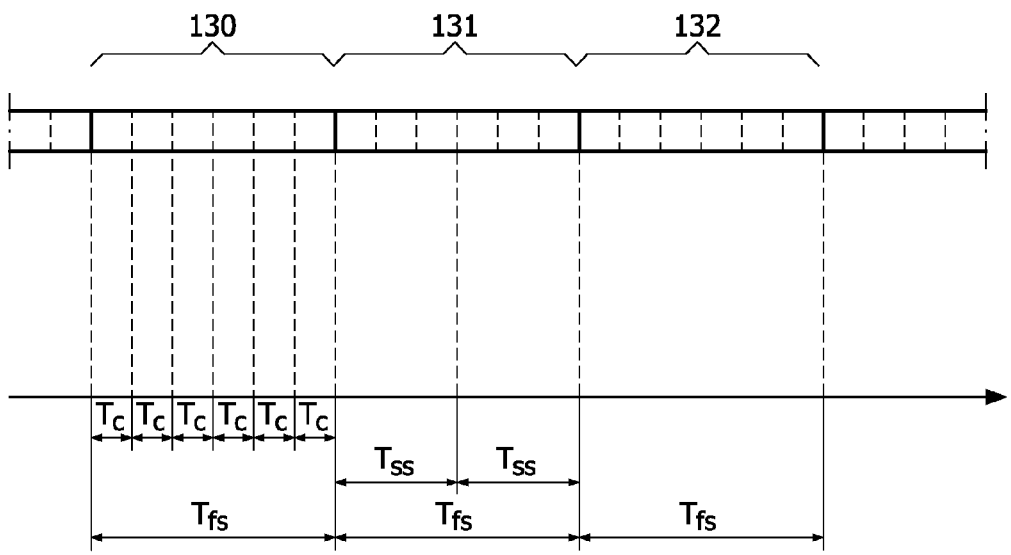
FIG. 4 is an illustration of chip sequences transmitted in the system of FIG. 1.

FIG. 4 shows the chip sequences corresponding to the reception of three consecutive pilot symbols 130 to 132. For simplicity, pilot symbols 130 to 132 are illustrated for a full pilot channelization code having a spreading factor equal to six. Thus, each spread pilot symbol consists of six consecutive chips.

Every consecutive chip corresponding to the same pilot symbol is transmitting during a pilot symbol period $T_{fs}$. Period $T_{fs}$ is equal to a chip interval $T_c$ multiplied by the spreading factor of the full pilot channelization code.

If there exists a shortened pilot channelization code which has a spreading factor which is x times smaller than the spreading factor of the full pilot channelization code and which is, at the same time, still fully orthogonal to any other channelization code simultaneously used by emitter 10, it is then possible to define a shortened pilot symbol period $T_{SS}$. Period $T_{SS}$ is equal to period $T_{fs}$ divided by x.

For example, FIG. 4 shows a shortened pilot symbol period $T_{SS}$. In this particular case, the shortened pilot channelization code is twice smaller than the full channelization code.

Figure 5:
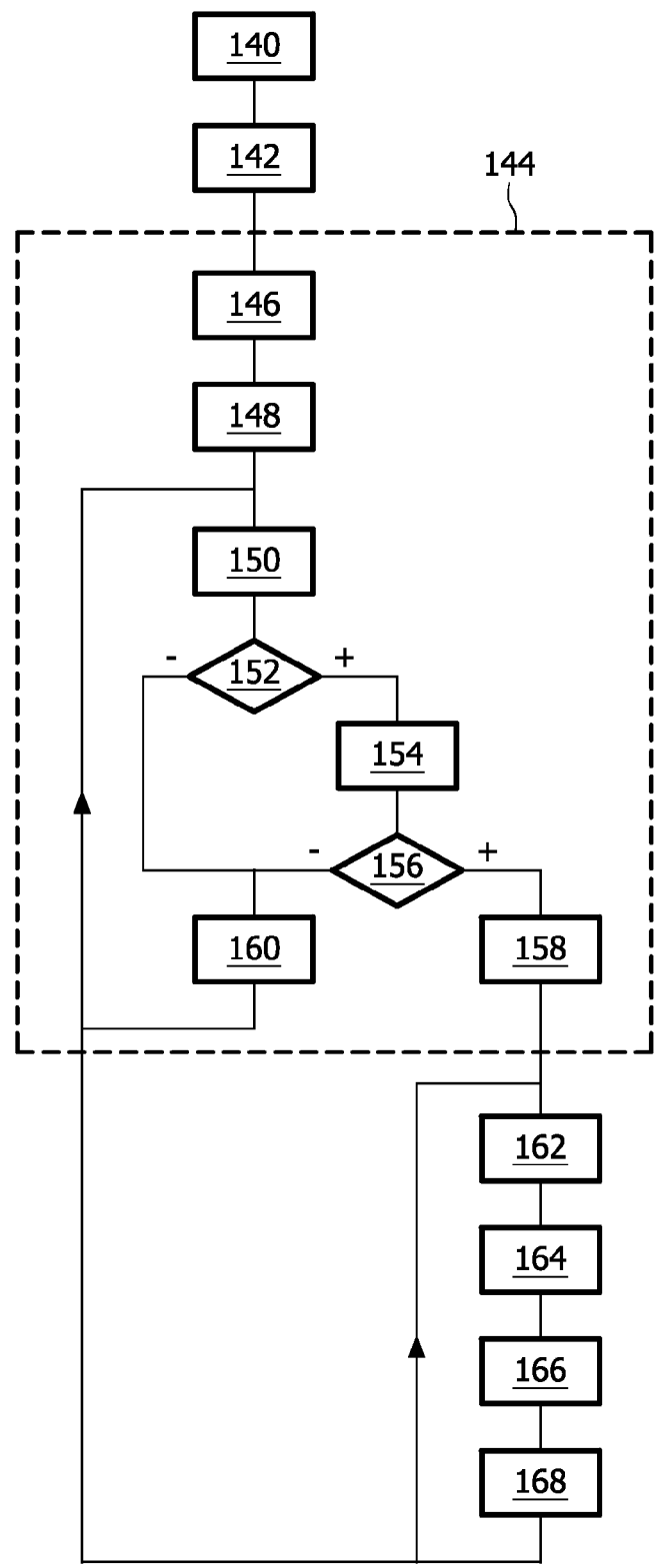
FIG. 5 is a flowchart of a symbol-level adaptation method implemented in the system of FIG. 1.

The operation of receiver 6 will now be described with reference to FIG. 5.

During the establishment of a connection between emitter 10 and receiver 6, in step 140, emitter 10 transmits instructions to receiver 6. Some of these instructions specify which channelization codes are allocated to the connection between emitter 10 and receiver 6.

It is assumed here that, in step 142, receiver 10 builds a list L comprising only the channelization codes to be used during this connection. List L is established according to the instructions received during step 140.

Then, during the reception of data symbols, in step 144, calculator 110 determines if there exists a shortened pilot channelization code which has a spreading factor shorter than the spreading factor of the full pilot channelization code, and which is still orthogonal to any of the other simultaneously active channelization codes. Hereinafter, a channelization code is said to be "active" if the power of the received signal despread with this active channelization code is higher than a predetermined threshold $S_1$.

First, in operation 146, calculator 110 establishes that any channelization code that does not belong to list L is a non-active code. Operation 146 is carried out without estimating the power of received signals despread with those codes, which are not in list L.

Subsequently, in operation 148, node 40 is set as the "current node".

Then, in operation 150, calculator 110 selects the neighbouring node of the current node. A neighbouring node is a node which is in the same level as the current node in the OVSF code tree and which has the same parent node in the level immediately below the current node level.

In operation 152, calculator 110 tests if the selected neighbouring node is associated with a channelization code that belongs to list L. If yes, calculator 110 proceeds to operation 154. During operation 154, calculator 110 estimates the power of the signal despread with the channelization code associated with the selected neighbouring node. Then, in operation 156, the estimated power is compared to threshold $S_1$. If the estimated power is greater than threshold $S_1$, the current channelization code is selected as the one to be used for the subsequent despreading of the pilot channel, in step 158.

If, on the contrary, the estimated power is smaller than threshold $S_1$, or if the channelization code associated with the neighbouring node does not belong to list L, calculator 110 proceeds to operation 160. In operation 160, the parent node of the current node in the code tree level immediately below the one of the current node is set as the new current node. Then, the method returns to operation 150. Operations 150 to 160 are iterated as long as the shortest pilot channelization code has not been selected in operation 158.

After operation 158, step 144 stops and pilot symbol despreading takes place, in step 162, at the end of each period $T_{SS}$ if a shortened pilot channelization code has been selected in step 144. Otherwise, despreading is carried out using the full pilot channelization code at the end of each period $T_{fs}$.

Subsequently, in step 164, the despread pilot symbol is then equalized to obtain pilot symbol estimation $\hat{a}_{1,n}$.

Then, in step 166, error e is computed.

Once a new error e has been computed, in step 168, calculator 110 adapts the value of the equalizer coefficient to minimize error e. During step 168, calculator 110 executes the adaptive algorithm, such as the MMSE algorithm and preferably the LMS algorithm or the NLMS algorithm.

Once the coefficient of equalizer 64 has been adapted, the method returns to step 162 if the end of period $T_{fs}$ has not been reached. At the end of period $T_{fs}$, the method returns to step 150 to determine if there still exists a shortened pilot channelization code.

For example, in common CDMA communication systems, channel PCCPCH is not active full-time. Hence, during these periods, pilot channel PCPICH can be despreading using channelization code $C_{ch,128,0}$ instead of channelization code $C_{ch,256,0}$. Thus, despreading of the pilot channel can take place every 128 chips instead of every 256 chips. This makes it possible to adapt the equalizer twice instead of once during the 256-chips pilot-symbol period.

Many other embodiments are possible. The above teachings can be implemented in equalizers having a different structure from the one described in detail in FIG. 3. For example, the structure of equalizer 64 can be the so-called fractionally spaced scheme as described in the following document:

F. Petre, M. Moonen, M. Engels, B. Gyselinckx, and H. D. Man, "*Pilot aided adaptive chip equalizer receiver for interference suppression in ds-cdma forward link,*" Proc. Vehicular Technology Conf., pp. 303-308, September 2000.

The family of MMSE algorithms includes many other iterative algorithms that minimize the square of error e. For example, this family also includes the RLS (Recursive Least Square) algorithm.

The symbol-level adaptation method has been described in the particular case of an equalizer implemented in a user equipment. However, the above teaching applies to any orthogonal CDMA receiver, like the one implemented in the base station, for example.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

The invention claimed is:

1. A symbol-level adaptation method to adapt at least one coefficient of an equalizer, the equalizer being used in an orthogonal CDMA (Code Division Multiple Access) receiver to correct channel distortions at chip level, the receiver simultaneously receiving a pilot channel spread with a full pilot channelization code and other channels spread with respective channelization codes, each channelization code being orthogonal to any other simultaneously used channelization codes, wherein the method comprises the steps of:
   a) determining if there exists a shortened pilot channelization code which has a spreading factor shorter than the spreading factor of the full pilot channelization code and which is, at the same time, still orthogonal to any other simultaneously active channelization codes, a channelization code being "active" if the power of the signal despread with this channelization code is higher than a predetermined threshold, and,
   b) if there exists a shortened pilot channelization code, despreading the pilot channel using the shortened pilot channelization code to obtain a pilot symbol estimation, or in the absence of such a code, despreading the pilot channel using the full pilot channelization code to obtain the pilot symbol estimation, and
   c) adapting the value of the equalizer coefficient according to the error between the pilot symbol estimation obtained from step b) and a corresponding expected pilot symbol.

2. The method according to claim 1, wherein step a) comprises the operations of estimating the power of a signal despread with one of the currently used channelization codes and of comparing the estimated power to the predetermined threshold to establish if the channelization code is an active channelization code or not.

3. The method according to claim 2, wherein the predetermined threshold is chosen high enough so that a channelization code simultaneously used to transmit a low power signal that cannot disrupt the despreading of the pilot channel is considered for step a) as a non-active channelization code.

4. The method according to claim 1, wherein step a) comprises an operation of establishing whether a channelization code is a non-active channelization code according to instructions received through one of the channels.

5. The method according to claim 1, wherein step a) comprises the operation of selecting the channelization code associated with a parent node of a node associated with the full pilot channelization code in an OVSF (Orthogonal Variable Spreading Factor) code tree, this parent node:
   having no other child node associated with a simultaneously active channelization code, and
   being as close as possible to a root node of the OVSF code tree.

6. The method according to claim 1, wherein, if there exists a shortened pilot channelization code having a spreading factor x times smaller than the spreading factor of the full pilot channelization code, at least steps b) and c) are executed at the end of each shortened pilot symbol period $T_{SS}$, period $T_{SS}$ being defined as follows: $T_{SS}=T_{fs}/x$, where $T_{fs}$ is the full pilot symbol period.

7. A memory having calculator instructions to execute a symbol-level adaptation method according to claim 1 when these instructions are executed by an electronic calculator.

8. An adaptive equalizer having at least one tunable coefficient and a calculator capable of executing a symbol-level adaptation method as claimed in-claim 1.

9. An orthogonal CDMA (Code Division Multiple Access) receiver having an equalizer according to claim 8.

* * * * *